United States Patent Office 3,011,947
Patented Dec. 5, 1961

3,011,947
SEPARATION OF SPIRAMYCINS BY COUNTER-CURRENT DISTRIBUTION
Jean Preud'homme and Yvan Charpentié, Paris, France, assignors to Societe des Usines Chimiques Rhone-Poulenc, Paris, France, a French body corporate
No Drawing. Filed Jan. 12, 1956, Ser. No. 558,609
Claims priority, application France Nov. 30, 1955
2 Claims. (Cl. 167—65)

The present invention relates to new antibiotics, salts thereof, and to processes for the preparation thereof.

A new antibiotic spiramycin is described in the publication "Antibiotics Annual 1954–1955," pages 724–727, published February 20, 1955, by Medical Encyclopedia Inc., New York City. This antibiotic is produced by fermentation of the Streptomyces strain S–3486 (NRRL No. 2420), to which there has been given the name spiramycin. This material is actually a mixture of three different constituents of very similar chemical composition and as stated in the said application the existence of these three constituents was analytically revealed by counter-current distribution by means of a Craig apparatus, using cyclohexane and an aqueous spiramycin solution containing 1% of disodium phosphate. The use of cyclohexane however is difficult owing to the relatively low solubility of spiramycin in that solvent. The present invention has for its principal object the provision of processes for the separation from the spiramycin complex of the individual spiramycin constituents which, for convenience are identified herein as spiramycin I, spiramycin II and spiramycin III.

The physical and biological characteristics of these spiramycin constituents are as follows:

the form of tablets with potassium bromide. Position of the absorption bands expressed in cm.$^{-1}$.

| Base I | Base II | Base III |
|---|---|---|
| 3,470 strong. | 3,460 strong. | 3,470 strong. |
| 2,970 strong. | 2,970 strong. | 2,970 strong. |
| 2,940 strong. | 2,940 strong. | 2,940 strong. |
| 1,735 strong. | 1,740 strong. | 1,740 strong. |
| 1,455 medium. | 1,457 medium. | 1,460 medium. |
|  |  | 1,380 medium. |
| 1,378 medium. |  |  |
|  | 1,372 medium. | 1,370 medium. |
| 1,317 medium. |  |  |
|  | 1,300 medium. | 1,300 medium. |
| 1,275 medium. | 1,275 medium. | 1,280 medium. |
| 1,237 medium. |  | 1,240 medium. |
|  | 1,232 strong. |  |
|  |  | 1,185 medium. |
| 1,160 strong. | 1,160 strong. | 1,162 strong. |
| 1,122 strong. | 1,122 strong. | 1,122 strong. |
| 1,090 strong. | 1,085 strong. | 1,085 strong. |
| 1,052 very strong. | 1,052 very strong. | 1,052 very strong. |
| 1,015 strong. | 1,015 strong. | 1,015 strong. |
| 993 strong. | 993 strong. | 995 strong. |
|  | 940 medium. |  |
| 905 medium. | 905 medium. | 906 medium. |
| 865 feeble. | 860 medium. | 865 feeble. |
| 840 medium. | 840 medium. | 842 medium. |
| 810 feeble. | 810 feeble. | 810 medium. |
| 782 medium. | 782 medium. | 782 medium. |
|  |  | 695 feeble. |
|  | 685 medium. | 685 feeble. |

The spectral differences between the three products are principally differences in the relative intensity of the absorption bands. These differences are found for the spectra in solution in carbon tetrachloride, which shows that they are not due to different states of crystallisation.

TABLE I

|  | Spiramycin I | Spiramycin II | Spiramycin III |
|---|---|---|---|
| Crude formula | $C_{45-48}H_{79-83}O_{16-17}N_2$ | $C_{45-48}H_{79-83}O_{15-16}N_2$ | $C_{45-48}H_{79-83}O_{15-16}N_2$. |
| Elementary Composition: |  |  |  |
| C, percent | 60.3 | 61.6 | 61. |
| H, percent | 8.7 | 8.5 | 8.5. |
| O, percent | 28.5 | 26.8 | 26.7. |
| N, percent | 3.2 | 3.1 | 3.0. |
| Molecular weight (ebullioscopy) | about 800 | about 800 | about 900. |
| Neutral equivalent | 463 | 464 | 473. |
| pK b | 7.7 | 7.6 | 7.6. |
| M.P. (on the Maquenne block) | 134–137° C | 130–133° C | 128–131° C. |
| [α]D20 (c.=1%, methanol) | −96° | −96° | −83°. |
| [α]D20 (c.=1%, ethanol) | −91° | −80° | −79°. |
| [α]D20 (c.=1%, chloroform) | −57° | −55° | −50°. |
| Ultraviolet spectrum (in solution in ethanol): |  |  |  |
| Wavelength of the maximum absorption | 232 mµ | 232 mµ | 232 mµ. |
| $E_{1\ cm.}^{1\%}$ at 232 mµ | 322 | 307 | 327. |
| Chromatography on paper [1] Rf | 0.04 | 0.15 | 0.22. |

[1] Chromatography on Whatman paper No. 1 impregnated with buffer having a pH value 9 (Na$_3$HPO$_4$, 12H$_2$O at a concentration 23.8 g./l.) using as developer solvent the light phase of the cyclohexane-methylisobutyl ether-water system (85:15:25 volumes) Descending technique—displacement of the solvent front 40 cm. in 4 hours at 25° C. Biological development on sewn gelose plate.

In Table II, the main infra-red absorption bands for the three products are indicated:

TABLE II

*Infra-red absorption spectrum of spiramycin bases I, II and III*

The spectrum was measured on the solid product in

The individual constituents of spiramycin are therefore defined as follows:

*Spiramycin I.*—A basic substance soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

Carbon ............................................ 60.3
Hydrogen .......................................... 8.7
Oxygen ............................................ 28.5
Nitrogen .......................................... 3.2 which basic substance displays, in ethyl alcohol solution a maximum absorption at 232 m$\mu$, has a molecular weight determined by the ebullioscopic method of about 800, a neutral equivalent of 463, a dissociation constant pKb of 7.7, a melting point on the Maquenne block of 134–137° C., has optical rotations $[\alpha]_D^{20}$ in methanol (c.=1%) of −96°, in ethanol (c.=1%) of −91° and in chloroform (c.=1%) of −57°, and which in solid form exhibits characteristic absorption in the infra-red region of the spectrum at the following frequencies expressed in reciprocal centimetres: 3470, 2970, 2940, 1735, 1455, 1378, 1317, 1275, 1237, 1160, 1122, 1090, 1052, 1015, 993, 905, 865, 840, 810, 782.

*Spiramycin II.*—A basic substance soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

Carbon ............................................ 61.6
Hydrogen .......................................... 8.5
Oxygen ............................................ 26.8
Nitrogen .......................................... 3.1 which basic substance displays, in ethyl alcohol solution a maximum absorption at 232 m$\mu$, has a molecular weight determined by the ebullioscopic method of about 800, a neutral equivalent of 464, a dissociation constant pK of 7.6, a melting point on the Maquenne block of 130–133° C., has optical rotations $[\alpha]_D^{20}$ in methanol (c.=1%) of −86°, in ethanol (c.=1%) of −80° and in chloroform (c.=1%) of −55°, and which in solid form exhibits characteristic absorption in the infra-red region of the spectrum at the following frequencies expressed in reciprocal centimetres: 3460, 2970, 2940, 1740, 1457, 1372, 1300, 1275, 1232, 1160, 1122, 1085, 1052, 1015, 993, 940, 905, 860, 840, 810, 782, 685.

*Spiramycin III.*—A basic substance soluble in chlorinated solvents, alcohols, hexane, aromatic hydrocarbons, ketones, ethyl acetate and amyl acetate and capable of forming salts with acids, which basic substance contains the elements carbon, hydrogen, oxygen and nitrogen in substantially the following proportions by weight:

Carbon ............................................ 61
Hydrogen .......................................... 8.5
Oxygen ............................................ 26.7
Nitrogen .......................................... 3.0 which basic substance displays, in ethyl alcohol solution a maximum absorption at 232 m$\mu$, has a molecular weight determined by the ebullioscopic method of about 900, a neutral equivalent of 473, a dissociation constant pKb of 7.6, a melting point on the Maquenne block of 128–131° M., has optical rotations $[\alpha]_D^{20}$ in methanol (c.=1%) of −83°, in ethanol (c.=1%) of −79° and in chloroform (c.=1%) of −50°, and which in solid form exhibits characteristic absorption in the infra-red region of the spectrum at the following frequencies expressed in reciprocal centimetres: 3470, 2970, 2940, 1740, 1460, 1380, 1370, 1300, 1280, 1240, 1185, 1162, 1122, 1085, 1052, 1015, 995, 906, 865, 842, 810, 782, 695, 685.

According to the present invention a process for the separation of the aforesaid constituents from spiramycin comprises subjecting the spiramycin to a separation treatment selected from the method of countercurrent distribution using an aromatic hydrocarbon solvent, the said method using a chlorinated hydrocarbon solvent, the method of fractional crystallisation and the method of chromatographic separation.

According to one embodiment of the present invention a process for the separation of the aforesaid constituents from spiramycin comprises subjecting a solution of spiramycin to treatment in a counter-current distribution apparatus employing as phases an organic phase consisting of an aromatic hydrocarbon or chlorinated hydrocarbon solvent, or mixture thereof, and an aqueous phase consisting of a salt solution buffered to pH 6 to 7, the two phases being initially mutually saturated, isolating the constituents from the organic phase fractions after rendering those fractions alkaline and evaporating the solvent and in the case of constituents II and III further purifying said constituents by crystallisation from an aromatic hydrocarbon solvent.

Separation by counter-current distribution may be carried out, for example, in a Craig apparatus (A. Weissberger, Technique of Organic Chemistry, Interscience Publishers, New York, vol. III, p. 286). It is possible to work at a temperature between 0° and 50° C., but it is preferable to work at about 20–25° C. There is employed, in accordance with the present invention, a solvent of the aromatic hydrocarbon group (such as benzene) or a chlorinated solvent (such as dichloroethane) or mixtures of these solvents. There is used as the second phase a buffer solution having a pH value between 6 and 7. The two phases are previously mutually saturated, that is to say, there is used for the separation, for example, the two phases separated by decanting a mixture composed of one volume of the organic solvent and one volume of the aqueous phase.

The spiramycin to be treated is brought into solution in a fraction of the organic phase. This fraction is equal to the volume of the organic phase to be introduced into one or more of the first cells of the counter-current distribution apparatus. It would be ideal to be able to introduce all the spiramycin into the first cell, because in this case a better separation would be effected, but a limit is set by questions of solubility if it is desired to treat relatively large quantities of product. An acceptable separation is effected by distributing the spiramycin in the first two, three or four cells.

The fractionation is effected in the manner usual in this type of separation, and the various constituents are isolated from the fractions containing them by extraction in the organic phase (after making alkaline), and thereafter evaporating the solvent from this phase. In the case of spiramycins II and III this is followed by crystallisation from a solvent of the aromatic hydrocarbon group, such for example as benzene.

According to a further embodiment of the invention a process for the separation of the said constituents from spiramycin comprises subjecting a solution of spiramycin to chromatography on alumina. If it is desired to separate spiramycin I from spiramycins II and III, it is advantageous to use a good solvent for spiramycins, such as an aromatic hydrocarbon (for example benzene) or ether. In this case, spiramycins II and III are separated from spiramycin I by elution by this same solvent. The spiramycin I remains on the column and is thereafter washed out by a benzene-acetone or benzene-alcohol mixture or by alcohol or acetone.

For separating the spiramycin II from the spiramycin III, a less effective solvent for spiramycins is employed, such as a mixture of cyclohexane and an aromatic hydrocarbon or a mixture of cyclohexane and ether. The elution by this same mixture gives fractions enriched in spiramycin III, while the spiramycin II remains on the column and can be washed out by ether and then by a mixture of ether and acetone.

On repeating these chromatographic operations, spiramycins I, II and III are obtained in the pure state. The bases are isolated from the fractions containing them by evaporation of the organic solvent, followed in the case of spiramycins II and III by crystallisation from an aromatic hydrocarbon solvent, such for example as benzene.

According to a further embodiment of the invention a process for the separation of the said constituents from spiramycin comprises subjecting spiramycin to fractional crystallisation from an aromatic hydrocarbon solvent, preferably benzene. It is possible by this method to separate the mixture of bases II and III, which crystallises from benzene, from base I, which remains in the mother liquor. The amorphous base I is then purified either by counter-current distribution or by chromatography with alumina. Bases II and III can be separated either by counter-current distribution or by chromatography with alumina, followed by recrystallisation from benzene.

Spiramycins I, II and III have substantially the same anti-bacterial spectrum and the same activity as the starting spiramycin.

The following examples show by way of non-limitative example how the invention can be carried into practice.

EXAMPLE I 20 g. of spiramycin in the form of its crude base are fractionated in a Craig apparatus comprising 60 cells, each having a capacity of 200 cc. The solvents employed consist of the two separate phases of the following mixture:

Benzene _____ 1 volume.
Buffer solution pH 6.47 ($KH_2PO_4$: 6.35 g.,
  $Na_2HPO_4$, $12H_2O$: 7.14 g.; water to make
  1 litre) _____ Do.

100 cc. of aqueous phase are introduced into each of the cells of the Craig apparatus disposed in a chamber at 24° C. and the spiramycin is dissolved in 200 cc. of the benzene phase. The distribution is then effected by the usual method. 100 cc. of spiramycin solution in the benzene phase are introduced into the first cell, shaken and decanted, and the benzene phase is transferred into the second cell; a further 100 cc. of spiramycin solution in the benzene phase is then introduced in the first cell. After agitation and decanting, the benzene phase is transferred from the second cell into the third cell, and that from the first cell into the second cell. The fractionation is continued in this way, introducing 100 cc. of benzene phase into the first cell after each decanting operation.

When 59 transfers in series have been effected, the separation is ended. The contents of each cell are collected, the aqueous phase is made alkaline at pH 9–10 by means of dilute caustic soda, agitated and the benzene phase is decanted. A second extraction of the aqueous phase is effected by means of 40 cc. of benzene, which is combined with the first decanted phase. The total volume of the benzene extract is adjusted to 150 cc. The dry extract is determined on an aliquot part of each benzene solution, and a curve is plotted to represent the concentration of dry extract in each cell. Three concentration maxima are obtained, which correspond to the following partition ratios of the three constituents:

|  | Cell having the maximum concentration | Partition ratio= Conc. in benzene phase/Conc. in aqueous phase |
| --- | --- | --- |
| Product A | 11 | $K_I$=0.22 |
| Product B | 25 | $K_{II}$=0.71 |
| Product C | 37 | $K_{III}$=1.6 |

Comparison of the experimental distribution curve with the curve calculated from the partition ratio found shows that the constituents are in the pure state in the solutions corresponding to the following cells:

Product A _____ Cells 5 to 15.
Product B _____ Cells 21 to 28.
Product C _____ Cells 35 to 45.

The benzene solutions containing a common constituent in the pure state are collected, the solvent is driven off by distillation under reduced pressure and the distillation residue is dried in vacuo (6 hours at 40° C. under 1 mm.). There are thus obtained:

|  | G. |
| --- | --- |
| Product A | 7.8 |
| Product B | 2.9 |
| Product C | 3.4 |

Product A is dried to constant weight in a vacuum oven (40° C. 1 mm. for 12 hours).

It has the following characteristics:

Composition: C%=60.3; H%=8.7; O%=28.5; N%=3.2.

Melting (on the Maquenne block)=134–137° C.

$[\alpha]_D^{20}$ (c.=1%, methanol)=−96°.

Ultraviolet spectrum (in solution in ethanol)—maximum absorption at 232 mµ

$$(E_{1\,cm.}^{1\%}=322)$$

These constants are those of spiramycin I (Table I).

Chromatography on Whatman paper No. 1 impregnated with buffer solution ($Na_2HPO_4$, $12H_2O$ at a concentration of 23.8 g./l. at pH 9), with the light phase of the cyclohexane-methylisobutylketone-water system (85:15:25 volumes) as developer solution, using the descending technique with a 4-hour development at 25° C., shows after bioautography on a nutrient agar plate inoculated with B. subtilis the presence of a single product characterised by an Rf of 0.04.

2 g. of spiramycin I base are converted into the corresponding sulphate by dissolution of the base in 5 cc. of methanol and adjusting the pH value of the solution to 5.5 by the addition of a dilute sulphuric acid solution in methanol. The salt is precipitated by adding the methanol solution to 250 cc. of anhydrous ether with agitation. The precipitate is centrifuged and dried.

Weight of sulphate obtained: 1.95 g.
$SO_4$, percent: 10.0
$[\alpha]_D^{20}$ (c.=2%, water): −73±1°

It is also possible to prepare other salts, such as the hydrochloride, the nitrate, the perchlorate and the phthalate by the same method.

2 g. of product B are dissolved in 4 cc. of benzene at boiling temperature, the solution is cooled to 10° C. and after 15 hours the crystals obtained are centrifuged, washed with 0.2 cc. of benzene and dried. 1.57 g. of crystallised product melting at 129–132° C. is thus obtained.

A second crystallisation carried out under the same conditions gives a product having a melting point of 130–133° C. and having the following characteristics:

Composition: C%=61.6; H%=8.5; O%=26.8; N%=3.1

$[\alpha]_D^{20}$ (c.=1%, methanol)=−86°

Ultraviolet spectrum (in solution in ethanol): maximum absorption at 232 mµ

$$(E_{1\,cm.}^{1\%}=307)$$

These constants are those of spiramycin II (Table I).

Chromatography on paper effected under the same conditions as for spiramycin I indicates the presence of a single product characterised by an Rf of 0.15.

2 g. of spiramycin II base are converted into sulphate.

Weight of sulphate obtained: 1.9 g.
$SO_4$, percent: 9.8
$[\alpha]_D^{20}$ (c.=2%, water): −72±1°

3 g. of the product C are dissolved in 6 cc. of benzene at boiling temperature, the solution is cooled to 10° C. and after 15 hours the crystals obtained are centrifuged, washed with 0.3 cc. of benzene and dried. 1.9 g. of crystallised product melting at 127–130° C. is thus obtained.

A second crystallisation carried out under the same conditions gives a product having a melting point of 128–131° C. having the following characteristics:

Composition: C%=61; H%=8.5; O%=26.7; N%=3.0
$[\alpha]_D^{20}$ (c.=1%, methanol)=−83°
Ultraviolet spectrum (in solution in ethanol): maximum absorption at 232 mμ

$$(E_{1\ cm.}^{1\%}=327)$$

These constants are those of spiramycin III (Table I).

Chromatography on paper carried out under the same conditions as for spiramycin I indicates the presence of a single product characterised by a R$f$ of 0.22.

2 g. of spiramycin III base are converted into sulphate.

Weight of sulphate obtained: 1.85 g.
SO$_4$, percent: 9.5
$[\alpha]_D^{20}$ (c.=2%, water): −72°±1° C.

EXAMPLE II 100 g. of spiramycin in the form of its crude base are dissolved at boiling temperature in 120 cc. of benzene, the solution is cooled to +10° C. and maintained under slow agitation for 15 hours, and the crystals obtained are centrifuged, washed with 30 cc. of benzene and dried, thus constituting the first fraction.

The mother liquors, to which the washing liquors are added, are concentrated in vacuo to 60 cc. and the solution obtained is subjected to repeated crystallisation by the same method whereby a second fraction is obtained.

A third fraction is obtained by evaporating the mother liquors to dryness.

50 g. of the first fraction are recrystallised from 100 cc. of benzene as hereinbefore indicated, and the crystals obtained are washed with 20 cc. of benzene and dried. 29 g. of crystallised product are obtained.

A third crystallisation of 20 g. of the above product from 40 cc. of benzene gives 14 g. of crystals containing only spiramycins II and III, the characteristics of which are as follows:

Spiramycin II content—56% by weight
Spiramycin III content—44% by weight
M.P. (on the Maquenne block)—193–140° C.
$[\alpha]_D^{20}$(c.=1%methanol)—86°

The spiramycin II and III contents, just given were determined by chromatography on paper under the conditions defined in Example I.

25 g. of base enriched with spiramycin I by crystallisation of the mixture of II and III and emanating from the third fraction of the first crystallisation are dissolved in 125 cc. of ether and the solution is chromatographed on a column of alumina (weight of alumina: 500 g., diameter of the column: 28 mm.). After the passage of the ethereal solution, the chromatograph is developed with ether, the object of which is to eliminate spiramycins II and III. Spiramycin I is then washed out by passing a mixture of ether and acetone (1:1 by volume) through the column.

The progress of the chromatography is summarised in the following table:

The relative compositions were determined by chromatography on paper under the conditions described above.

Fractions 7, 8, 9 and 10 are collected and concentrated under reduced pressure and the base obtained is dried in vacuo (40° C. for 20 hours at 1 mm.).

The base thus prepared consists of spiramycin I having the following characteristics:

Melting point on the Maquenne block: 133–135° C.
$[\alpha]_D^{20}$(c.=1% methanol): −94°
Ultra-violet spectrum (in solution of ethanol)

$$E_{1\ cm.}^{1\%}\ at\ 232\ m\mu:\ 316$$

Chromatography carried out on paper under the conditions of Example I shows that the product contains a single constituent characterised by an R$f$ of 0.04.

20 g. of spiramycin base II+III obtained by three successive crystallisations and having the following composition:

| | Percent by weight |
|---|---|
| Spiramycin II | 56 |
| Spiramycin III | 44 | are fractionated in the Craig apparatus used in the course of the separation described in Example I. The operation is carried out as described in that example with the following system of solvents:

Benzene _____ 1 volume.
Buffer solution having a pH value of 6.24 (KH$_2$PO$_4$:7.26 g., Na$_2$HPO$_4$, 12H$_2$O:4.8 g., water to make 1 litre) _____ Do.

When the distribution has been completed, the aqueous phases are rendered alkaline and extracted with benzene and the dry extract of each benzene solution is determined. The distribution curve shows two maxima corresponding to spiramycins II and III characterised by the following partition ratios:

| | Cells having maximum concentration | Partition ratio= conc. in benzene phase/conc. in aqueous phase |
|---|---|---|
| spiramycin II | 11 | $K_{II}$=0.22 |
| spiramycin III | 26 | $K_{III}$=0.76 |

Comparison of the experimental distribution curve with the curve calculated from the values of the partition ratio found show that the two constituents are in the pure state in the solutions emanating from the following cells:

Spiramycin II _____ Cells 6 to 15.
Spiramycin III _____ Cells 21 to 31.

The benzene solutions corresponding to these two groups of cells are dried and the bases obtained are crystallised from benzene as described in Example I.

7.2. g. of spiramycin II and 5.1 g. of spiramycin III

| No. of fractions | Composition of the solvent | Volume, cc. | Total dry extract, g. | Composition, percent ||| 
|---|---|---|---|---|---|---|
| | | | | spiramycin I | spiramycin II | spiramycin III |
| 1 | ether | 800 | 0.4 | | | |
| 2 | do | 200 | 4 | 36 | 30 | 34 |
| 3 | do | 200 | 2.4 | 60 | 22 | 18 |
| 4 | do | 200 | 1.6 | 78 | 12 | 10 |
| 5 | do | 200 | 1 | 90 | traces | traces |
| 6 | do | 500 | 0.5 | 90 | traces | traces |
| 7 | ether-acetone (1:1 volume). | 400 | 1.1 | 100 | | |
| 8 | do | 400 | 4.9 | 100 | | |
| 9 | do | 400 | 2.9 | 100 | | |
| 10 | do | 400 | 1 | 100 | | | in crystallised form are thus obtained, the characteristics of which are as follows:

|  | Spiramycin II | Spiramycin III |
|---|---|---|
| M.P. on the Maquenne block | 130–132° C | 128–130° C |
| $[\alpha]_D^{20}$ (c.=1% methanol) | −86° | −82° |
| Ultra-violet spectrum (in ethanol solution): | | |
| $E_{1\ cm.}^{1\%}$ at 232 m$\mu$ | 305 | 325 |
| Chromatography on paper | a single product | a single product |
| Chromatography on paper Rf | 0.15 | 0.22 |

EXAMPLE III 50 g. of crystallised mixture of spiramycins II and III prepared as in Example II and having the following composition:

Percent by weight
Spiramycin II _____ 56
Spiramycin III _____ 44 are dissolved in 450 cc. of a mixture of cyclohexane and ether (2:1 by volume) and the solution is chromatographed on an alumina column (weight of alumina: 600 g., a diameter of the column: 35 mm.). The chromatograph is developed first by the same mixture of cyclohexane and ether and then successively by ether and by a mixture of ether and acetone (1:1 by volume).

The progress of the chromatography is summarised by the following table:

| No. of fractions | Composition of the solvent | Volume, cc. | Total dry Extract, g. | Composition, percent | |
|---|---|---|---|---|---|
| | | | | spiramycin II | spiramycin III |
| 1 | cyclohexane-ether (2:1 by vol.) | 200 | 0.1 | | |
| 2 | do | 200 | 1.5 | | |
| 3 | do | 100 | 6 | traces | 95 |
| 4 | do | 100 | 5 | 15 | 85 |
| 5 | do | 300 | 6 | 30 | 70 |
| 6 | do | 500 | 1.8 | 50 | 50 |
| 7 | do | 1,400 | 3 | 60 | 40 |
| 8 | ether | 500 | 0.9 | 70 | 30 |
| 9 | do | 500 | 4.7 | 80 | 20 |
| 10 | do | 500 | 2 | 80 | 20 |
| 11 | ether-acetone (1:1 by vol.) | 1,000 | 7 | 85 | 15 |
| 12 | do | 1,000 | 7.4 | 95 | traces |

The relative compositions were determined by chromatography on paper under the conditions described above.

Fraction 3 is concentrated under reduced pressure and the residue is dried and thereafter crystallised from 12 cc. of benzene as indicated in Example I. 4 g. of spiramycin III in the form of its crystallised base are thus obtained.

The treatment of fraction 12 under the same conditions, followed by a crystallisation by the method indicated in Example I, gives 5.8 g. of crystallised spiramycin II in the form of its base.

Characteristics of the products obtained:

|  | Spiramycin II | Spiramycin III |
|---|---|---|
| M.P. on the Maquenne block | 130–132° C | 128–130° C |
| $[\alpha]_D^{20}$ (c.=1% methanol) | −85° | −82° |
| Ultra-violet spectrum (in solution in ethanol): | | |
| $E_{1\ cm.}^{1\%}$ at 232 m$\mu$ | 305 | 325 |
| Chromatography on paper | a single product | a single product |
| Chromatography on paper Rf | 0.15 | 0.22 |

EXAMPLE IV 50 g. of spiramycin in the form of its crude base are dissolved in 500 cc. of benzene and the solution is chromatographed on a column containing 750 g. of alumina (diameter of the column: 40 mm.). After the passage of the benzene solution, the chromatograph is developed with benzene, which has the effect of washing out all the spiramycins II and III. A mixture of benzene and acetone (1:3 by volume) is thereafter used for the development, which has the effect of washing out the spiramycin I.

The progress of the chromatography is summarised by the following table:

| No. of fractions | Composition of the solvent | Volume, cc. | Total dry extract, g. | Composition, percent | | |
|---|---|---|---|---|---|---|
| | | | | spiramycin I | spiramycin II | spiramycin III |
| 1 | benzene | 800 | 5 | 10 | 30 | 60 |
| 2 | do | 500 | 9 | 10 | 35 | 55 |
| 3 | do | 500 | 7 | 20 | 40 | 40 |
| 4 | do | 500 | 2 | 50 | 30 | 20 |
| 5 | benzene-acetone (1:3 by volume) | 400 | 5 | 80 | 10 | 10 |
| 6 | do | 400 | 8 | 100 | | |
| 7 | do | 400 | 3 | 100 | | |
| 8 | do | 800 | 1 | 100 | | |

Fractions 6, 7 and 8 are collected and concentrated under reduced pressure and the base obtained is dried in a vacuum oven (40° C. for 20 hours at 1 mm.). The base thus prepared consists of spiramycin I having the following properties:

Melting point on the Maquenne block: 133–134° C.
$[\alpha]_D^{20}$ (c.=1% methanol): −94° C.
Ultra-violet spectrum (in solution in ethanol)

$E_{1\ cm.}^{1\%}$ at 232 m$\mu$: 318

Chromatography on paper carried out under the conditions of Example I shows that this base contains a single constituent characterised by an Rf of 0.04.

By further chromatography of the mixture of bases of combined fractions 1 and 2, in accordance with the method indicated in Example III, it is possible to obtain bases II and III in the pure state in the form of crystallised products.

We claim:

1. Process for obtaining separately spiramycin I, spiramycin II and spiramycin III which comprises subjecting a crude material containing the same to countercurrent distribution in a Craig countercurrent distribution apparatus of 60 cells, effecting 59 transfers at a temperature of about 20–25° C. with an organic phase consisting of benzene and an aqueous phase buffered at a hydrogen-ion concentration within the range pH 6 to pH 7, the two phases being initially mutually saturated, isolating the constituents from the organic phase fractions after rendering those fractions alkaline and evaporating the solvent, the spiramycin I being in cells 5 to 15, spiramycin II being in cells 21 to 28 and spiramycin III being in cells 35 to 45, and in the case of spiramycins II and III subjecting the products to fractional crystallisation by dissolving them in a hot aromatic hydrocarbon solvent and allowing the resulting solution to cool.

2. Process as defined in claim 1 wherein the aromatic hydrocarbon solvent is benzene.

References Cited in the file of this patent

UNITED STATES PATENTS

| | | |
|---|---|---|
| 2,378,449 | Tishler | June 19, 1945 |
| 2,653,899 | Bunch et al. | Sept. 29, 1953 |

OTHER REFERENCES

Craig et al.: J. Biol. Chem., vol. 16, 1945, pp. 321–332.

Leach et al.: JACS, vol. 69, 1947, p. 474.

Swart: J. Clin. Inv., September 1949, vol. 28, pp. 1045–1046.

Newton et al.: Biochem. J., pp. 597–603, vol. 53, No. 4, March 1953.

Zechmeister: Progress in Chromatography, 1938–1947, pp. 247–260, pub. 1950, by John Wiley and Sons, Inc.

Baron Handbook of Antibiotics, pub. by Reinhold Pub. Co., N.Y.C., 1950, pp. 265–266.

"Antibiotics Annual 1954–1955," pp. 724–727 and 827–830, pub. February 1955, by Med. Encyclopedia Inc.